United States Patent [19]

Narita et al.

[11] 4,284,934
[45] Aug. 18, 1981

[54] MOTOR CONTROL APPARATUS WITH AN IMPROVED THYRISTOR CHOPPER CIRCUIT

[75] Inventors: Hiroshi Narita; Michimasa Horiuchi; Masahiko Ibamoto; Hideaki Rokutan, all of Katsuta, Japan

[73] Assignee: Hitachi, Ltd., Tokyo, Japan

[21] Appl. No.: 10,304

[22] Filed: Feb. 7, 1979

[30] Foreign Application Priority Data

Feb. 8, 1978 [JP] Japan ................................. 53/12482
Feb. 20, 1978 [JP] Japan ................................. 53/17638

[51] Int. Cl.³ ............................................. H02P 5/16
[52] U.S. Cl. ........................ 318/345 C; 318/345 G; 318/505
[58] Field of Search ............ 318/345 G, 345 C, 345 R, 318/505; 363/124, 135; 307/252 M

[56] References Cited

U.S. PATENT DOCUMENTS

| | | | |
|---|---|---|---|
| 3,488,756 | 1/1970 | Skrivanek, Jr. ............... | 318/331 |
| 3,536,972 | 10/1970 | Lutz et al. ...................... | 318/331 |
| 3,588,654 | 6/1971 | Balazs ............................. | 318/331 |
| 3,763,418 | 10/1973 | Beck et al. ..................... | 363/124 |
| 3,932,800 | 1/1976 | Iwamoto et al. ............... | 363/124 |
| 3,942,094 | 3/1976 | Akamatsu ...................... | 307/252 M |
| 4,074,175 | 2/1978 | Born et al. ..................... | 318/332 |

Primary Examiner—David Smith, Jr.
Attorney, Agent, or Firm—Craig and Antonelli

[57] ABSTRACT

A motor control apparatus to supply current from a D-C source to an electric motor has a thyristor chopper circuit, the duty factor of which is controlled depending on a current instruction signal. The thyristor chopper circuit is provided between the terminals of the D-C source in series with an electric motor, and has main and auxiliary thyristors. A series connection of a capacitor and a reactor, forming commutating elements, is connected across the auxiliary thyristor and oscillates to generate a pulse of current through a forward diode in order to turn off the main thyristor when the auxiliary thyristor is turned on. In addition, a saturable current transformer having first, second and third windings is provided. Through the first winding chopper current flows, and the second winding operates as the reactance of the commutating elements. The third winding is provided within the closed circuit formed when the chopper circuit is blocked, and causes current across the secondary winding to charge the capacitor of said chopper circuit.

11 Claims, 6 Drawing Figures

MOTOR CONTROL APPARATUS WITH AN IMPROVED THYRISTOR CHOPPER CIRCUIT

BACKGROUND OF THE INVENTION

The present invention relates to a motor control apparatus, more particularly to an improved motor control apparatus having a thyristor chopper.

In recent years, circuits to control electric power supplied to electric motors have been proposed, in which the voltage is applied to the motor intermittently at a predetermined period through a chopper circuit using thyristors or power transistors so that the average value thereof is maintained at a desired value. In such a control circuit, it is desired, in addition to reduction of size, that a duty factor of the chopper circuit, i.e., the ratio of conductive time to the sum of conductive and non-conductive times be controlled over a wide range.

In U.S. patent application filed on Aug. 25, 1978, of "A MOTOR CONTROL APPARATUS WITH AN IMPROVED THYRISTOR CHOPPER CIRCUIT", invented by H. NARITA et al and assigned to Hitachi, Ltd., now U.S. Pat. No. 4,209,733, issued June 24, 1980 there is shown a motor control apparatus to supply current from a D-C source to an electric motor through a thyristor chopper circuit. The thyristor chopper circuit is provided between the terminals of the D-C source in series with an electric motor, and has main and auxiliary thyristors. A series connection of a capacitor and a reactor, forming commutating elements, is connected across the auxiliary thyristor and oscilates to generate a pulse of current through a forward diode in order to turn off the main thyristor when the auxiliary thyristor is turned on. In addition, a saturable current transformer is so provided that through a primary winding thereof chopper current flows, and the secondary winding operates as the reactance of the commutating elements. Current flowing through the secondary winding therefore depends on the chopper current flowing through the primary winding.

Other relevant prior art is as follows:

(1) R. E. Morgan, "Time Ratio Control with Combined SCR and SR Commutation", *IEEE Trans. on Communications and Electronics*, Vol. 83, pages 366–371, July, 1964. In this article, there is shown a commutating circuit for TRC that combines an auxiliary SCR and a SR. This commutating circuit contributes to the reduction of the cost and size of the auxiliary SCR. However, it has drawbacks in that two kind of reactors $L_C$ and $SR_C$ are necessary, the former having a relatively high inductance and the latter being a saturable reactor, and in that commutating current through the auxiliary SCR is always determined by commutating elements of a capacitor $C_C$ and the reactor $L_C$.

(2) W. McMurry, "Silicon-Controlled Rectifier D-C to D-C Power Power Converters", *IEEE Trans. on Communication and Electronics*, Vol. 83, pp. 198–203, March, 1964. This shows various ways in which saturable transformers are used in silicon-controlled rectifiers.

(3) U.S. Pat. No. 3,875,486, "Motor Speed Control Circuit". This shows Jone's chopper circuit having a transformer. This Jone's chopper, however, differs from an ordinary chopper circuit in construction and operation.

(4) U.S. Pat. No. 3,903,465, "Chopper Control System". In this chopper control system, the application of the chopper-off signel to the chopper is prohibited by a prohibit circuit.

SUMMARY OF THE INVENTION

Accordingly, an object of the present invention is to provide a motor control apparatus having an improved chopper circuit, in which the relative reduction in size of the commutating elements, particularly in size of the commutating capacity is accomplished.

Another object of the present invention is to provide a motor control apparatus in which the speed of the electric motor can be controlled over a relatively wide range.

According to the present invention, the objects mentioned above are achieved by a motor control apparatus having a chopper circuit in which main and auxiliary thyristors and commutating elements including a series connection of a capacitor and a reactor are connected in parallel to one another, wherein there is further provided a saturable current transformer having first, second and third windings, through the first winding motor current or chopper current flowing while the second winding operating as the reactor of the commutating elements, and characterized in that the third winding is connected within the closed circuit formed when said chopper is blocked, and that the commutating capacitor is further charged by current transformed in response to current flowing through the third winding.

Another object mentioned above is achieved by a motor control apparatus further having chopper control means in which the commutating period of the chopper circuit is detected, and the timing of the chopper-on signal is adjusted on the basis of the detected commutating period.

The objects mentioned above and other objects and advantages of the present invention will become more apparent from the following detailed description of the preferred embodiments given by reference to the accompanying drawings.

DETAILED DESCRIPTION OF PREFERRED EMBODIMENTS

Figure 1:
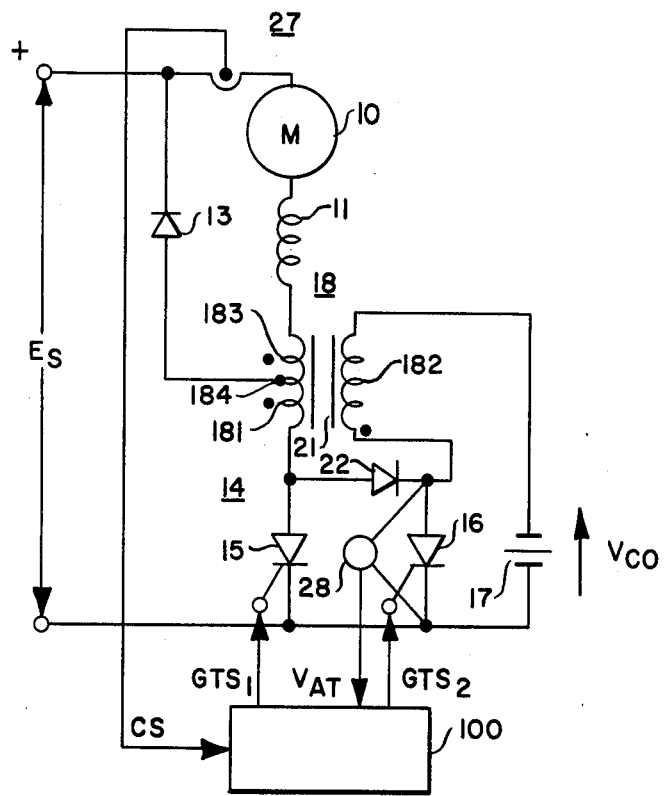
FIG. 1 is a schematic diagram of an embodiment of a motor control apparatus according to the present invention.

Referring now to the drawings, where like elements are indicated by like reference numerals, and particularly to FIG. 1, a D-C electric motor 10 has a field winding 11 connected in series therewith. Across the series connection of the motor 10 and the field winding 11, a freewheel diode 13 is connected. The motor 10 is supplied with current from a D-C voltage source $E_S$ through a chopper circuit 14, and when the chopper circuit 14 is blocked, current can continue to flow through the freewheel diode 13.

The chopper circuit 14 has a main thyristor 15 and an auxiliary thyristor 16, commutating elements including a capacitor 17 and a saturable transformer 18. The saturable current transformer 18 has a first winding 181, a second winding 182, a third winding 183 and a saturable iron-core 21 magnetically coupled there between. The first winding 181 and the third winding 183 are connected in series to each other, and the conjuctive tap 184 thereof is connected to the anode of the freewheel diode 13. The first winding 181 forms a series connection with the chopper circuit 14, and the third winding 183 a closed circuit together with the electric motor 10, the field winding 11 and the freewheel diode 13. In the figure the polarity of the first the second and the third windings 181, 182 and 183 are indicated by conventional designation. The anode of the main thyristor 15 is connected to the lower end of the first winding 181, and the cathode thereof is connected to the negative terminal of the D-C source $E_S$. The cathode of the auxiliary thyristor 16 is connected to that of the main thyristor 15. The anode of the auxiliary thyristor 16 is connected through a forward diode 22 to that of the main thyristor 15. The commutating elements, including a series connection of the second winding 182 of the saturable current transformer 18 and the capacitor 17, is provided in parallel to the auxiliary thyristor 16. The second winding 182 operates as saturable reactor in the commutating elements mentioned above.

The main and the auxiliary thyristors 15 and 16 of the chopper circuit 14 are controlled in the ON-OFF operations by gate triggering signals $GTS_1$ and $GTS_2$ from a chopper control circuit 100. The chopper control circuit 100 receives a current signal CS from a current transformer 27 and an auxiliary thyristor voltage signal $V_{AT}$ from a voltage detector 28. The current transformer 27 detects current supplied to the electric motor 10, and the voltage detector 28 the voltage appearing across the auxiliary thyristor 16. The detailed description of the chopper control circuit 100 will be given afterward.

Figure 2:
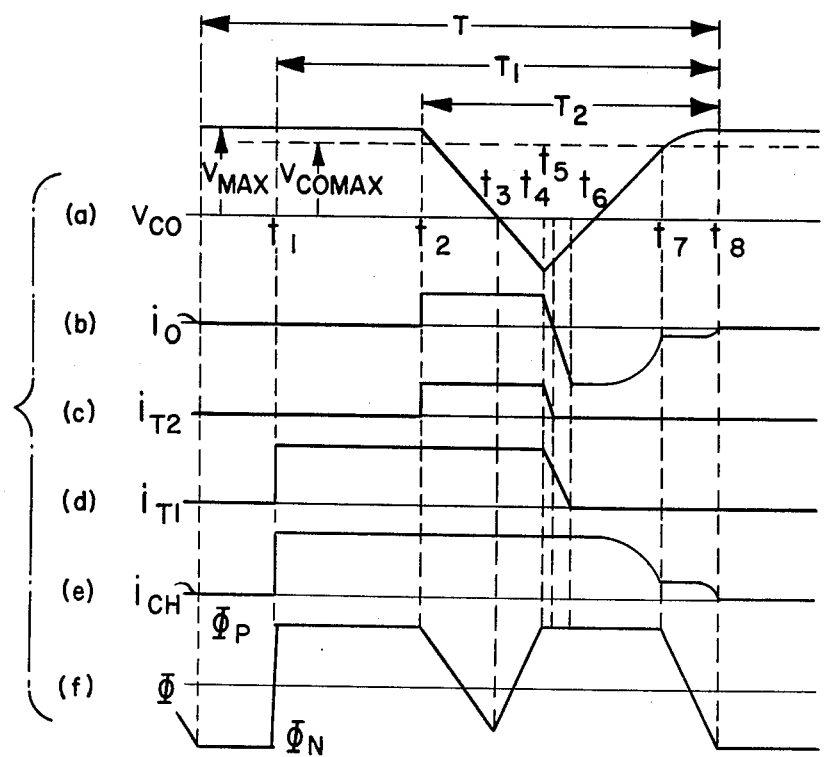
FIGS. 2(a) through 2(f) show waveforms of current, voltage, and magnetic flux at various portions of the chopper circuit of the motor control apparatus shown in FIG. 1 for a better understanding of the invention.

The operation of the above-mentioned chopper circuit 14 is given with reference to FIGS. 2(a) through 2(f) hereinafter. Before the main thyristor 15 is turned on at time $t_1$, the capacitor 17 is previously charged up to the voltage $V_{MAX}$. The waveform of the voltage $V_{CO}$ across the capacitor 17 is shown in FIG. 2(a). Although the voltage $V_{CO}$ appearing across the charged capacitor 17 is theoretically expressed as $V_{CO} = E_S$, the voltage $V_{CO}$ in an actual circuit becomes greater than $E_S$. This will be explained in detail later.

When the main thyristor 15 is turned on at $t_1$, current $i_{T1}$, which is equal in amplitude to chopper current $i_{CH}$, begins to flow through the main thyristor 15 as shown in FIG. 2(d). After the main thyristor 15 is turned on, however, the forward diode 22 blocks discharge current from the capacitor 17, and the voltage across the capacitor 17 remains $V_{MAX}$ ($>E_S$) until the auxilary thyristor 16 is turned on. At time $t_2$ when the auxiliary thyristor 16 is turned on, the charged capacitor 17 begins to discharge through it, and discharge current flows. Because the chopper current $i_{CH}$ which is shown in FIG. 2(e) flows through the third and the first windings 183 and 181, a pulse of the discharge current $i_O$ shown in FIG. 2(b) flows through the second winding 182 of the saturable current transformers 18. The amplitude of the discharge current $i_O$ can be described by the following equation:

$$i_O = \frac{N_1 - N_3}{N_2} \cdot i_{CH} \quad (1)$$

wherein $N_1$, $N_2$ and $N_3$ are the numbers of turns of the first, the second and the third windings 181, 182 and 183 of the saturable current transformer 18, respectively.

Figure 3:
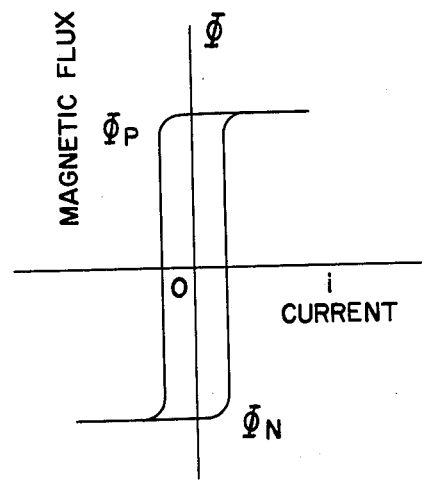
FIG. 3 shows current-magnetic flux characteristic curve of a saturable core used in a saturable current transformer shown in FIG. 1.

In FIG. 3 there is shown the current-magnetic flux $(I-\phi)$ characteristic curve of the saturable iron-core 21 of the saturable current transformer 18, which is well known in the art. Thus, when the auxiliary thyristor 16 is turned on at the time $t_2$, the voltage $V_{CO}$ across the capacitor 17 is applied across the second winding 182. The pulse of the current $i_O$ described by the equation (1) flows through the second winding 182 as the discharge current from the capacitor 17, and the voltage $V_{CO}$ across the capacitor 17 decreases. At the same time, the magnetic flux of the saturable iron-core 21 is drawn from the positive saturated value $\phi_P$ toward the negative one $\phi_N$ as the discharge current flows through the second winding 182. At time $t_3$, the voltage $V_{CO}$ becomes zero and the magnetic flux $\phi$ reaches almost the negative saturated value $\phi_N$. However, as is shown in FIG. 2(b), the current $i_O$ continues to flow through the second winding 182 into the capacitor 17 as charge current after the capacitor 17 has fully discharged. The current $i_O$ continues to flow until the magnetic flux $\phi$ turns to the positive saturated value $\phi_P$ again, because the saturable iron-core 21 of the saturable current transformer 18 is not saturated during that period. Therefore, the capacitor 17 becomes charged in the opposite polarity by the charge current $i_O$. The magnetic flux $\phi$ is drawn back and at time $t_4$ when the magnetic flux reaches the positive saturated value $\phi_P$ again, the inductance of the second winding 182 becomes very small rapidly. Then, the commutating elements, including the series connection of the second winding 182 and the capacitor 17, which is well-known L-C resonant circuit, starts to oscillate at the resonant frequency. At the same time, the forward diode 22 becomes conductive and the reverse voltage $V_{CO}$ across the capacitor 17 is applied across the main and the auxiliary thyristors 15 and 16. As is shown in FIGS. 2(c) and 2(d), current $i_{T2}$ through the auxiliary thyristor 16 decreases to zero at time $t_5$ when the current $i_O$, which is oscillated by the L-C resonant circuit, becomes zero. The current $i_{T1}$ through the main thyristor 15 also decreases to zero at time $t_6$ when the current $i_O$ becomes equal to the chopper current of the reverse polarity $(-i_{CH})$. These thyristors 15 and 16, consequently, turn off one after another. However, the chopper current $i_{CH}$, as shown in FIG. 2(e), continues to flow through the forward diode 22 and the second winding 182 into the capacitor 17 until it is charged up to the voltage $V_{COMAX}$ at time $t_7$. At the time $t_7$, the chopper current $i_{CH}$ becomes small, and current flowing through the electric motor 10 begins to flow through the freewheel diode 13. Thus, these currents flowing through the first and the second windings 181 and 182 will decrease to zero while the current flowing through the closed circuit formed of the motor 10 and the freewheel diode 13 continues to flow through the third winding 183 of the saturable current transformer 18. The magnemotive force generated by the current flowing through the third winding 183 draws the magnetic flux $\phi$ of the saturable iron-core 21 from the positive saturated value $\phi_P$ toward the negative one $\phi_N$. Because of the current transforming action of the saturable current transformer 18, that is the saturable iron-core 21 is not saturated during period $(t_7-t_8)$, currents flow through the first and the second windings 181 and 182, respectively. The amplitude $i_W$ of the above-mentioned currents can be described by the following equation:

$$i_W = \frac{N_3}{N_1 + N_2} \cdot i_M = \frac{N_3}{N_1 + N_2} \cdot i_{CH} \quad (2)$$

wherein $N_3$ is the number of turns of the third winding 183 and $i_{CH}$ the current flowing through the electric motor 10, the amplitude of which is equal to the chopper current $i_{CH}$.

These currents flowing through the first and the second windings 181 and 182 decrease to zero at time $t_8$ when the magnetic flux $\phi$ of the saturable current transformer 18 reaches to the negative saturated value $\phi_N$. And the current flowing through the second winding 182 flows into the capacitor 17, therefore, the capacitor 17 is further charged up to the voltage $V_{MAX}$ again. The voltage $V_{MAX}$ can be described by the following equation:

$$V_{MAX} = V_{COMAX} + \frac{N_3}{N_1 + N_2} \cdot i_M \cdot \frac{t_8 - t_7}{C_O} \quad (3)$$

wherein $(t_8-t_7)$ represents the period during which the current $i_W$ flows into the capacitor 17 and $C_O$ the capacitance of the capacitor 17. The chopper circuit 14, then, turns off at the time $t_8$.

It is well known in the art that the capacitor 17 in the actual circuit is charged up to the voltage $V_{COMAX}$ greater than the source voltage $E_S$ because of the impedance through which the charge current flows into the capacitor 17, i.e. the second winding 182, wiring of the circuit, and so forth. Assuming that the above-mentioned inductance is $L'$, the over-charge voltage $V_{COMAX}$ across the capacitor 17 becomes as follows:

$$V_{COMAX} = E_S + i_{CH} \cdot \sqrt{L'/C_O} \quad (4)$$

In the embodiment shown in FIG. 1, as is apparent from the equation (3), by the transformed current $i_W$ which flows through the second winding 182 during the period $(t_7-t_8)$ in which the magnetic flux $\phi$ decreases from the positive saturated value $\phi_P$ toward the negative one $\phi_N$, the capacitor 17 of the commutating elements is charged up to the voltage $V_{MAX}$ which is greater than the over-charge voltage $V_{COMAX}$ by the voltage $$\left( \frac{N_3}{N_1 + N_2} \cdot i_{CH} \cdot \frac{t_8 - t_7}{C_O} \right).$$

Therefore, energy necessary to perform the turn-off of the thyristors 15 and 16 completely can be charged in the capacitor 17 which has capacity relatively smaller than that of the conventional chopper circuit.

Further, as apparent from the equation (3), the over-charged voltage $V_{MAX}$ across the capacitor 17 can be set at a desired value by selecting respective appropriate numbers of turns for the first, the second and the third windings 181, 182 and 183. Therefore, the relative reduction in the capacity $C_O$ of the capacitor 17 can be accomplished. However, of course, it should be noted that there is a limit to the reduction of the capacity $C_O$, i.e., the capacitor 17 must have enough capacity $C_O$ to perform the turn-off of the thyristors 15 and 16 completely. And this embodiment shown in FIG. 1 can be effectively employed in case of a D-C voltage source of large voltage fluctuations, such as, a battery power source including voltage fluctuations of +20% to −50%. In this case, it becomes unnecessary to make the capacity $C_O$ of the capacitor 17 large on account of the voltage fluctuation of the voltage source $E_S$ because of the transformed current $i_W$ which flows through the second winding 182 during the period $(t_7-t_8)$. Thus, the voltage $$\frac{N_3}{N_1 + N_2} \cdot i_{CH} \cdot \frac{t_8 - t_7}{C_O}$$

of the second term of equation (3) is determined so as to compensate for the voltage decrease component at the lowest supply voltage ascribed to the voltage fluctuation of the voltage source $E_S$.

As an example, the detail of the chopper circuit, which is applied to a motor control for use in a forklift, is described hereinafter. The motor control has a D-C source voltage $E_S=36$ (V) and controls motor current over the range from 50 (A) to 600 (A). In the chopper circuit, capacitor of 170 ($\mu$F) is provided as the capacitor 17. The details of the saturable current transformer 18 is as follows:

the material of the iron-core 21 of a ring type: silicon steel the cross section of the iron-core 21: $5 \times 10^{-4}$ (m$^2$)

turn number $N_1$ of the first winding 181: 5 turn number $N_2$ of the second winding 182: 7 turn number $N_3$ of the third winding 183: 1

However, the chopper circuit 14 shown in FIG. 1 has a drawback in that a controllable range of a duty factor of the chopper circuit, i.e., the ratio of conductive period $T_1$ to the sum of conductive and non-conductive period T, becomes relatively narrow. Namely, a commutating period $T_2$, as is apparent from the waveforms shown in FIGS. 2(a) through 2(f), includes a period $(t_7-t_8)$ during which the capacitor 17 is further charged from the voltage $V_{COMAX}$ up to the voltage $V_{MAX}$ by the transformed current $i_W$ mentioned above, as well as a period $(t_2-t_5)$ during which the current $i_O$ flows through the auxiliary thyristor 15, a period $(t_5-t_6)$ during which the main thyristor 15 is turned off and a period $(t_6-t_7)$ during which the capacitor 17 is charged up to $V_{COMAX}$.

Figure 4:
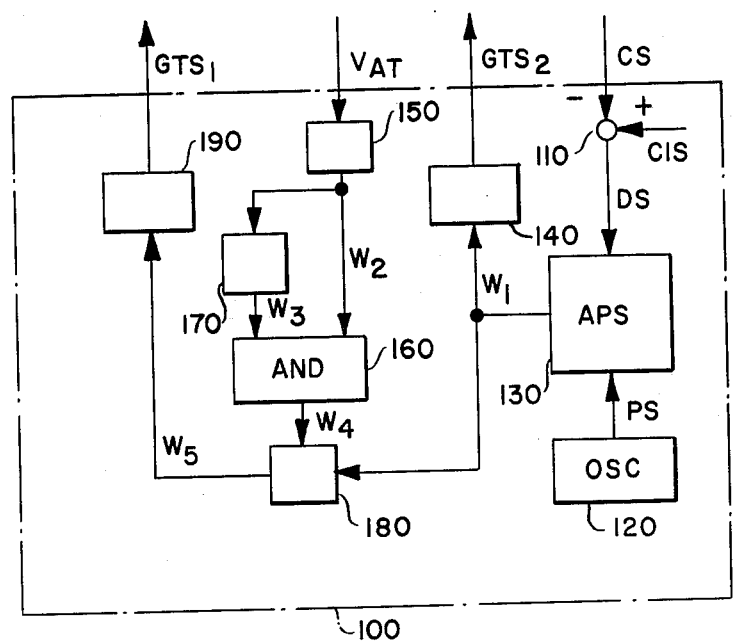
FIG. 4 is a schematic diagram of a chopper control circuit shown in FIG. 1.

In FIG. 4, there is shown a detail of the chopper control circuit 100 which can eliminate such drawback as mentioned above. Referring to the figure, the chopper control circuit 100 includes a comparator 110, to the negative input of which the current signal CS from the current transformer 27 is applied. To the positive input of the comparator 110, a current instruction signal CIS is applied. The current instruction signal CIS is generated by a current instruction signal generator (not shown) which may be constructed with, for example, a potentiometer generating a signal, the voltage value of which varies depending on the position of the intermediate tap thereof. Comparing the current instruction signal CIS and the current signal CS, the comparator 110 produces a difference signal DS.

An oscillator 120 generates a pulse signal PS at a predetermined period. An automatic phase shifter 130 receives the pulse signal PS and the difference signal DS from the comparator 110, and produces an output pulse $w_1$. A differentiating circuit 140 receiving the output pulse $w_1$ generates a gate triggering signal $GTS_2$ to the gate of the auxiliary thyristor 16 at the trailing edge of the output pulse $w_1$, i.e., when the output pulse $w_1$ falls.

A voltage comparator 150 generates an output pulse $w_2$ when the auxiliary thyristor voltage signal $V_{AT}$ from the voltage detector 28 is equal or less than zero. The output pulse $w_2$ is applied to the one of two inputs of logical AND gate circuit 160 and an input of an one-shot multivibrator 170. This one-shot multivibrator 170 produces an output pulse $w_3$ to the other input of the AND gate circuit 160 upon the receipt of the output pulse $w_2$ as the triggering signal. The AND gate circuit 160 provides an output pulse $w_4$ to a control terminal of a gate circuit 180 when both output pulses $w_2$ and $w_3$ appear at the inputs thereof. The gate circuit 180 receiving the output pulse $w_1$ at the input thereof passes the output pulse $w_1$ to an another differentiating circuit 190 during the period in which no output pulse $w_4$ appears at the control terminal thereof. The differentiating circuit 190 receiving an output pulse $w_5$ from the gate circuit 180 generates a gate triggering signal $GTS_1$ to the gate of the main thyristor 15 in response to the rising of the output pulse $w_5$, i.e., when the output pulse $w_5$ rises.

Figure 5:
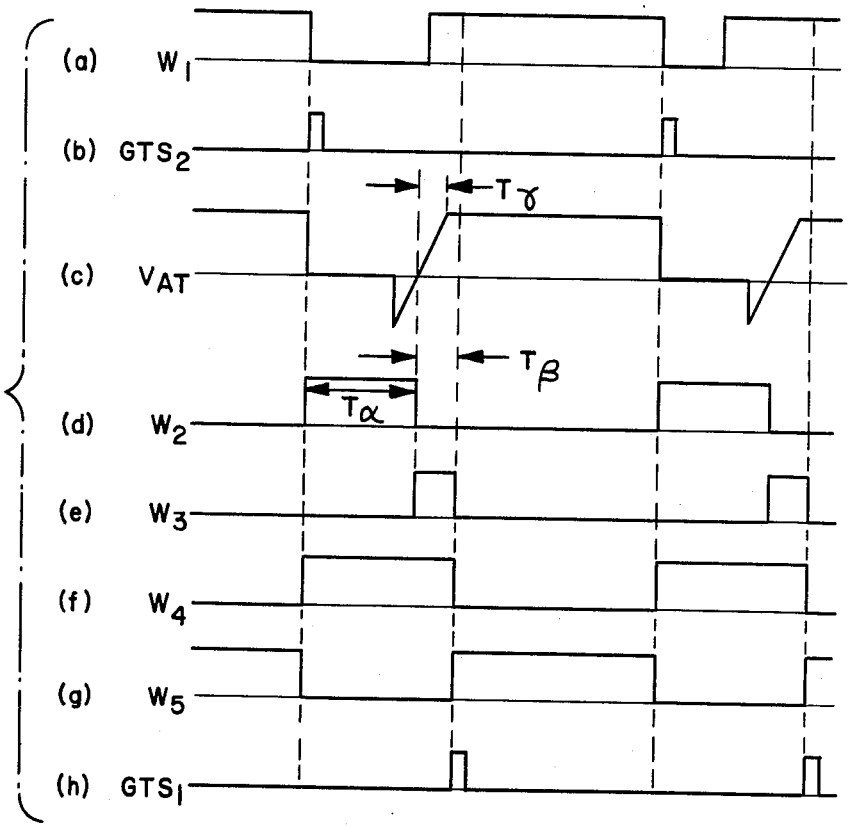
FIGS. 5(a) through 5(h) also show various waveforms at various portions of the chopper control circuit shown in FIG. 4 for explanation thereof.

The operation of the above-mentioned chopper control circuit 100 is given with reference to FIGS. 5(a) through 5(h) hereinafter. The voltage value of the current signal CS is in proportion to the amplitude of the motor current $i_M$ flowing through the electric motor 10. The comparator 110 provides the automatic phase shifter 130 with the difference signal DS between the current signal CS and the current instruction signal CIS. The automatic phase shifter 130 produces the output pulse $w_1$, the pulse width of which is dependent on the value of the difference signal DS. The output pulse $w_1$ is shown in FIG. 5(a). The differentiating circuit 140, as is shown in FIG. 5(b), generates the gate triggering signal $GTS_2$ at the moment when the output pulse $w_1$ falls.

On the other hand, the auxiliary thyristor voltage signal $V_{AT}$, which is shown in FIG. 5(c), is applied to the voltage comparator 150. This voltage comparator 150, as is shown in FIG. 5(d), produces the output pulse $w_2$ when the auxiliary thyristor voltage signal $V_{AT}$ is equal or less than zero. This output pulse $w_2$ is applied to one input of the AND gate circuit 160, and the pulse width of the output pulse $w_2$ is represented by $T_\alpha$. The one-shot multivibrator 170 produces the output pulse $w_3$ at the moment when the output pulse $w_2$ falls as is shown in FIG. 5(e). The pulse width $T_\beta$ of the output pulse $w_3$ will be described in more detail afterward. As is apparent from FIG. 5(f), the AND gate circuit 160 produces the output pulse $w_4$, the pulse width of which is equal to the sum of these $(T_\alpha + T_\beta)$ of the output pulses $w_2$ and $w_3$. Receiving the output pulse $w_4$ having such pulse width, the gate circuit 180 passes the output $w_1$ to the differentiating circuit 190 during the time when no output pulse $w_4$ appears at the control terminal thereof. The output pulse $w_5$ of this gate circuit 180 is shown in FIG. 5(g). The differentiating circuit 190 generates the gate triggering signal $GTS_1$ when the output pulse $w_5$ rises as is shown in FIG. 5(h).

In the chopper control circuit 14 mentioned above, the pulse width $T_\alpha$ is determined by the auxiliary thyristor voltage signal $V_{AT}$ indicating the voltage across the auxiliary thyristor 16 of the chopper circuit 14. As is well known in the art, the voltage across the auxiliary thyristor 16 lies at zero during the time that current $i_{T2}$ flows therethrough after the gate triggering signal $GTS_2$ appears. It increases from negative value to zero as the capacitor 17 discharges, and continues to increase to the positive value until the capacitor 17 is charged to the voltage $V_{MAX}$. Thus, the pulse width $T_\alpha$ indicates the period during which a commutation is achieved by triggering the auxiliary thyristor 16. The greater the duty factor of the chopper circuit 14, the shorter the period of the commutation, i.e., the pulse width $T_\alpha$ will be.

The pulse width $T_\beta$ of the output pulse $w_3$, i.e., the time constant of the one-shot multivibrator 170 is determined as follows. Because the amplitude of current flowing through the second winding 182 depends on the motor current $i_M$, the period $T_\gamma$ during which the auxiliary thyristor voltage signal $V_{AT}$ increases from zero to the positive value also depends on the motor current $i_M$. The less the amplitude of the motor current $i_M$, the longer is the period $T_\gamma$. Therefore, the pulse width $T_\beta$ of the pulse $w_3$ is set at the period equal to or a little longer than the period $T_\gamma$ which is determined when the minimum amplitude of the motor current $i_M$ occurs.

As is apparent from the above description, because the period $T_\alpha$ during which the commutation is achieved is detected and the gate triggering signal $GTS_1$ is given with delay $T_\beta$ after the completion of the commutation, the maximum conductive time varies depending on the amplitude of the motor current $i_M$. Namely, the range over which the duty factor of the chopper circuit 14 can be controlled is extended.

Figure 6:
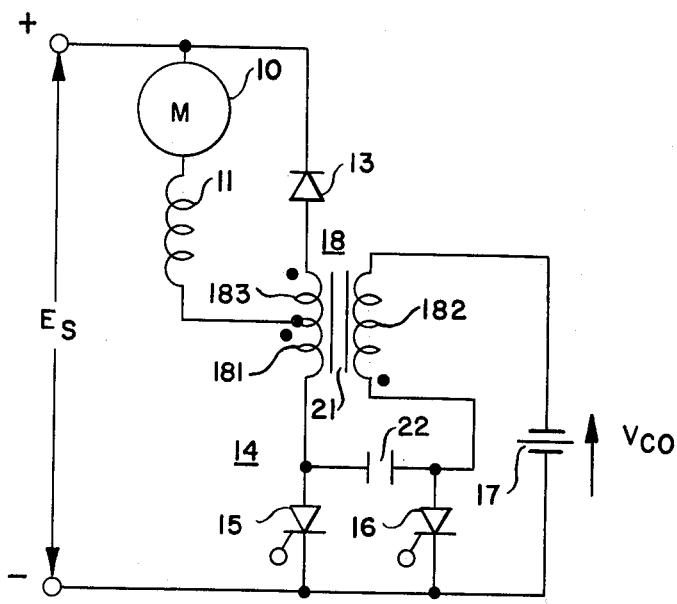
FIG. 6 shows a variation of the chopper circuit shown in FIG. 1.

FIG. 6 shows a variation of the chopper circuit shown in FIG. 1, in which the third winding 183 of the saturable current transformer 18 is so provided that the motor current $i_M$ flows therethrough only when the chopper circuit 14 is blocked. That is, the first and the third windings 181 and 183 are connected in series to each other in the same polarity, and the upper end of the third winding 183 is connected to the anode of the freewheel diode 13.

While we have shown and described several embodiments in accordance with the present invention, it is understood that the same is not limited thereto but is susceptible of numerous changes and modifications as are obvious to those of ordinary skill in the art, and we therefore do not wish to be limited to the details described and shown herein but intend to cover all such changes and modifications as are obvious to those of skill in the art.

What is claimed is:

1. A motor control apparatus to control the supply of current from a source to an electric motor comprising:
   a chopper circuit connected to said source in series with the electric motor and including main and auxiliary thyristors connected in parallel with each other and a capacitor connected to the thyristors in parallel;
   a freewheel diode connected in parallel to the electric motor, whereby motor current continues to flow therethrough when said chopper circuit is blocked;

chopper control means for controlling the duty factor of said chopper circuit depending on a current instruction signal; and a saturable current transformer having a first winding connected to carry at least a part of the current flowing through said electric motor, a second winding connected within the closed circuit which is formed with the capacitor of said chopper circuit when the auxiliary thyristor of said chopper circuit is turned on, and a third winding magnetically coupled with said second winding and connected within the closed circuit which is formed with said freewheel diode when said chopper circuit is blocked for inducing current through the second winding to charge the capacitor of said chopper circuit in response to the current flowing therethrough.

2. A motor control apparatus to control the supply of current from a source to an electric motor comprising:

a chopper circuit connected to said source in series with the electric motor and including main and auxiliary thyristors connected in parallel with each other and a capacitor connected to the thyristors;

a freewheel diode connected in parallel to the electric motor, whereby motor current continues to flow therethrough when said chopper circuit is blocked;

chopper control means for controlling the duty factor of said chopper circuit depending on a current instruction signal; and a saturable current transformer having a first winding connected in series to said chopper circuit, a second winding connected in series to the capacitor of said chopper circuit, and a third winding magnetically coupled with said second winding and connected to carry the motor current flowing through said freewheel diode when said chopper circuit is blocked to induce a current in said second winding to charge the capacitor of said chopper circuit in response to the current flowing through the third winding.

3. A motor control apparatus to control the supply of current from a source to an electric motor comprising:

a chopper circuit connected to said source in series with the electric motor and including main and auxiliary thyristors connected in parallel with each other and a capacitor connected to the thyristors in parallel;

a freewheel diode connected in parallel to the electric motor, whereby motor current continues to flow therethrough when said chopper circuit is blocked;

chopper control means for controlling the duty factor of said chopper circuit depending on a current instruction signal; and a saturable current transformer having a first winding connected to carry at least a part of the current flowing through said electric motor, a second winding connected within the closed circuit which is formed with the capacitor of said chopper circuit when the auxiliary thyristor of said chopper circuit is turned on, and a third winding magnetically coupled with said second winding and connected within the closed circuit which is formed with said freewheel diode when said chopper circuit is blocked for inducing current through the first and the second windings to charge the capacitor of said chopper circuit in response to the current flowing through said third winding.

4. A motor control apparatus as claimed in claim 1 or 2 or 3 wherein the first and the third windings of said saturable current transformer, which are connected in series and in opposite polarity to each other, are connected in series between said chopper circuit and the electric motor, and the second winding is electro-magnetically coupled to the first winding in opposite polarity and to the third winding in same polarity.

5. A motor control apparatus as claimed in claim 1 or 2 or 3 wherein the first and the third windings of said saturable current transformer, which are connected in series and in same polarity to each other, are connected in series between said chopper circuit and said freewheel diode, and the second winding is electro-magnetically coupled to the first and the third windings in opposite polarity.

6. A motor control apparatus as claimed in claim 1 or 2 or 3 wherein said chopper control means includes:

means for detecting the instantaneous amplitude of said current supplied to the electric motor and for generating an output;

means for comparing the output of said current amplitude detecting means to the current instruction signal and for generating a comparison signal;

means for applying gate triggering signal to the gate auxiliary thyristor of said chopper circuit in accordance with the comparison signal from said comparing means;

means for detecting completion of the commutating operation of chopper circuit;

means for delaying the comparison signal from said comparing means by a constant period after the completion of the commutation; and means for applying gate triggering signal to the gate of the main thyristor of said chopper circuit in accordance with the comparison signal delayed by said delaying means.

7. A motor control apparatus as claimed in claim 6 wherein said commutating operation detecting means comprises;

means for detecting the voltage across the auxiliary thyristor of said chopper circuit and for generating a voltage output; and means for comparing the voltage output from said voltage detecting means and for generating an output when the voltage signal is equal to or less than zero.

8. A motor control apparatus as claimed in claim 6 wherein said delaying means comprises an one-shot multivibrator.

9. A motor control apparatus as claimed in claim 2, wherein said capacitor is connected to said thyristors in parallel.

10. A motor control apparatus to control the supply of current from a source to an electric motor with a motor winding comprising:

main and auxiliary thyristors connected in parallel and controlled by control signals, a capacitor connected in parallel with said main and auxiliary thyristors, control means to produce said control signals for controlling the duty factor of said main and auxiliary thyristors and said capacitor, and winding means to transmit a signal to said motor winding and to charge said capacitor after said main and auxiliary thyristors are blocked.

11. A motor control apparatus as claimed in claim 9, comprising means responsive to said chopper control means to transmit a signal to actuate said main thyristor after commutation is completed.

* * * * *